P. H. BENNION.
AUTOMOBILE CURTAIN.
APPLICATION FILED DEC. 4, 1917.
1,318,528.
Patented Oct. 14, 1919.
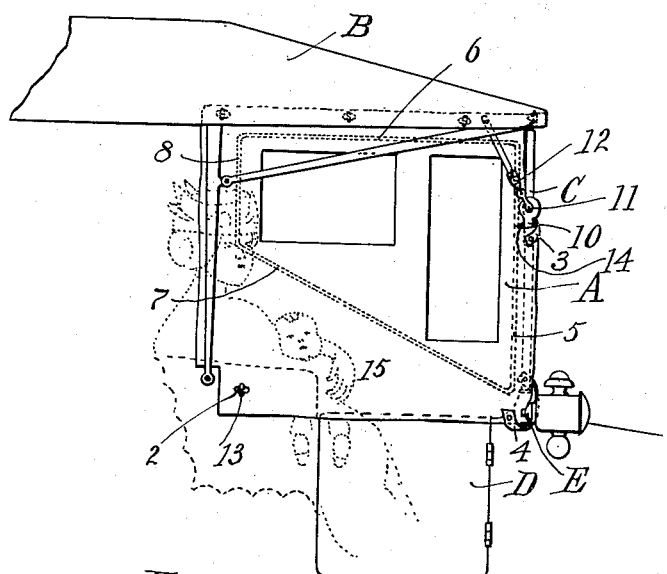
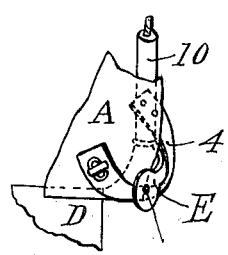
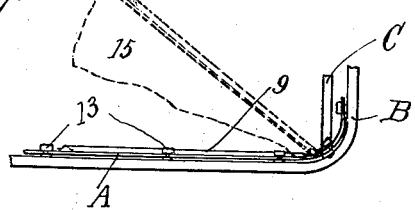
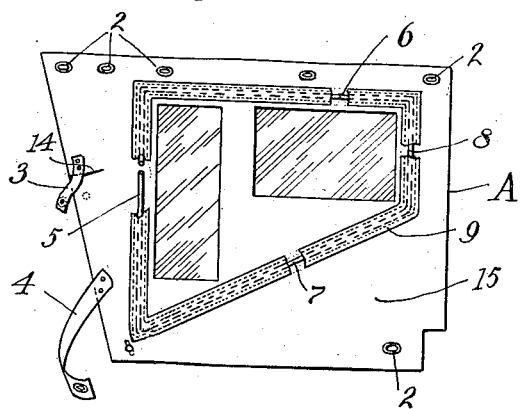
Inventor,
Percival H. Bennion
his Attorney.

UNITED STATES PATENT OFFICE.

PERCIVAL H. BENNION, OF ST. PAUL, MINNESOTA.

AUTOMOBILE-CURTAIN.

1,318,528.   Specification of Letters Patent.   Patented Oct. 14, 1919.

Application filed December 4, 1917. Serial No. 205,427.

*To all whom it may concern:*

Be it known, that I, PERCIVAL H. BENNION, a citizen of the United States, residing at St. Paul, in the county of Ramsey and State of Minnesota, have invented certain new and useful Improvements in Automobile-Curtains, of which the following is a specification.

My invention relates to improvements in removable closures or curtains for vehicles, particularly automobiles, and is designed to be used in connection with the usual folding top and the windshield and body of the car.

The object of my invention is to provide an improved sheltering device or curtain, which may be easily and quickly secured into working position and as readily removed therefrom, and which may be made of soft pliable material such as leather or cloth, but may be controlled so as to be moved bodily, thus clearing substantially the whole entrance opening to the interior of the body of the car, and thereby affording comfortable ingress and egress.

A further object of my invention is to provide improved means for safeguarding against breakage, automobile closures of the type having light-admitting transparencies in their sides; and also for providing a closure which may be manipulated without disturbing the occupants of the seats in the vehicle.

More particularly the invention consists in the construction, combination and arrangements of parts hereinafter described and claimed.

In the accompanying drawings forming part of this specification,

Figure 1 is a side view of the front part of an automobile showing the curtain in closed position;

Fig. 2 is a plan view of the back or inside of the curtain partly broken away,

Fig. 3 is a plan view of a part of the top frame showing the curtain attached, and Figs. 4 and 5 are fragmentary views of details.

In the drawings, I have shown the invention applied to a Ford automobile, but I wish it understood that it may be applied to other types of vehicles having irregular entrance openings, and therefore requiring a flexible closure, which will readily conform to the varying contours met with.

Referring to the drawings, Fig. 1 shows an automobile canopy top B, a windshield C, a car body D, and a lamp bracket E supported on the body. The windshield comprises, in part, an upright 10, firmly fixed at its base to the body D, and has the usual upper swinging section, which rotates about the pivot 11.

The windshield is projected upwardly, with its top in close proximity to the top B, and is connected therewith, by adjustable strap connection 12, which is attached to the pivot 11, and projects upwardly and rearwardly to a point on the canopy frame, where its upper end is firmly fastened.

In Fig. 2, A represents a curtain having eyelets 2 along and near its upper and lower edges, and straps 3 and 4 secured adjacent one of its side edges. The free ends of straps 3 and 4 are provided with the usual "snap fastener" and "eyelet and button" connecting means, for detachably connecting their ends to the body of the curtain.

A stiffening frame, somewhat triangular in form, and comprising a vertically disposed member 5, and a horizontal member 6 joined together by a lower diagonal member 7 and a short outer member 8, is secured to the inner side of the curtain A, by means of the retaining strip 9, said strip being firmly sewed or stitched over the frame members and to the curtain.

Thus the frame, renders that portion of the curtain within its confines, safe against bending and warping, thereby safeguarding any transparency within the frame against breakage.

The vertical member 5, of the frame, is so placed on the curtain, as to leave a comparatively wide border between said member and the outer diagonal edge of the curtain which supports the straps 3 and 4.

It will be noted, that the stiffened portion of the curtain, lies within the outline of the frame; the diagonal, lower edge of the frame effecting a free, unstiffened flap 15.

In use, the curtain is buttoned, as by means of buttons 13 and eyelets 2, to the inner side of the canopy top B, and the outer side of the body D. The hinge edge of the curtain, having the straps 3 and 4 and the eyelets 3 as a fastening means, is removably attached thereby, to the upright 10, and the canopy top B as shown in Fig. 1, the vertical member 5 being adjacent to and approximately parallel with the upright 10.

A slit 14, in the curtain, enables the upper portion of the hinge edge to be buttoned on the canopy top behind the windshield, as shown in Fig. 4.

As shown in Fig. 3, the curtain, when unbuttoned, may be swung inwardly and out of the way and against the windshield, the flap 15 below the diagonal member 7, being free to ride over any obstruction within the car, such as an infant in the lap of an occupant or merchandise which may be carried on the seat.

As shown in Fig. 5, the hinge edge of the curtain is firmly bound around the lamp bracket E and the pivot 14 by means of the straps 3 and 4.

I claim:

In an automobile closure, the combination with a body, a top, a windshield having an upright and fastening means on said body and said top; of a removable curtain having engaging means to engage said fastening means and said upright; and a stiffening frame fixed on said curtain and embracing the major portion thereof, said frame having a lower diagonal edge, to effect a free unstiffened flap in said curtain for the purpose specified.

In testimony whereof I affix my signature in presence of two witnesses.

PERCIVAL H. BENNION.

Witnesses:
H. S. JOHNSON,
GEORGE VOELKER.